Patented Oct. 19, 1954

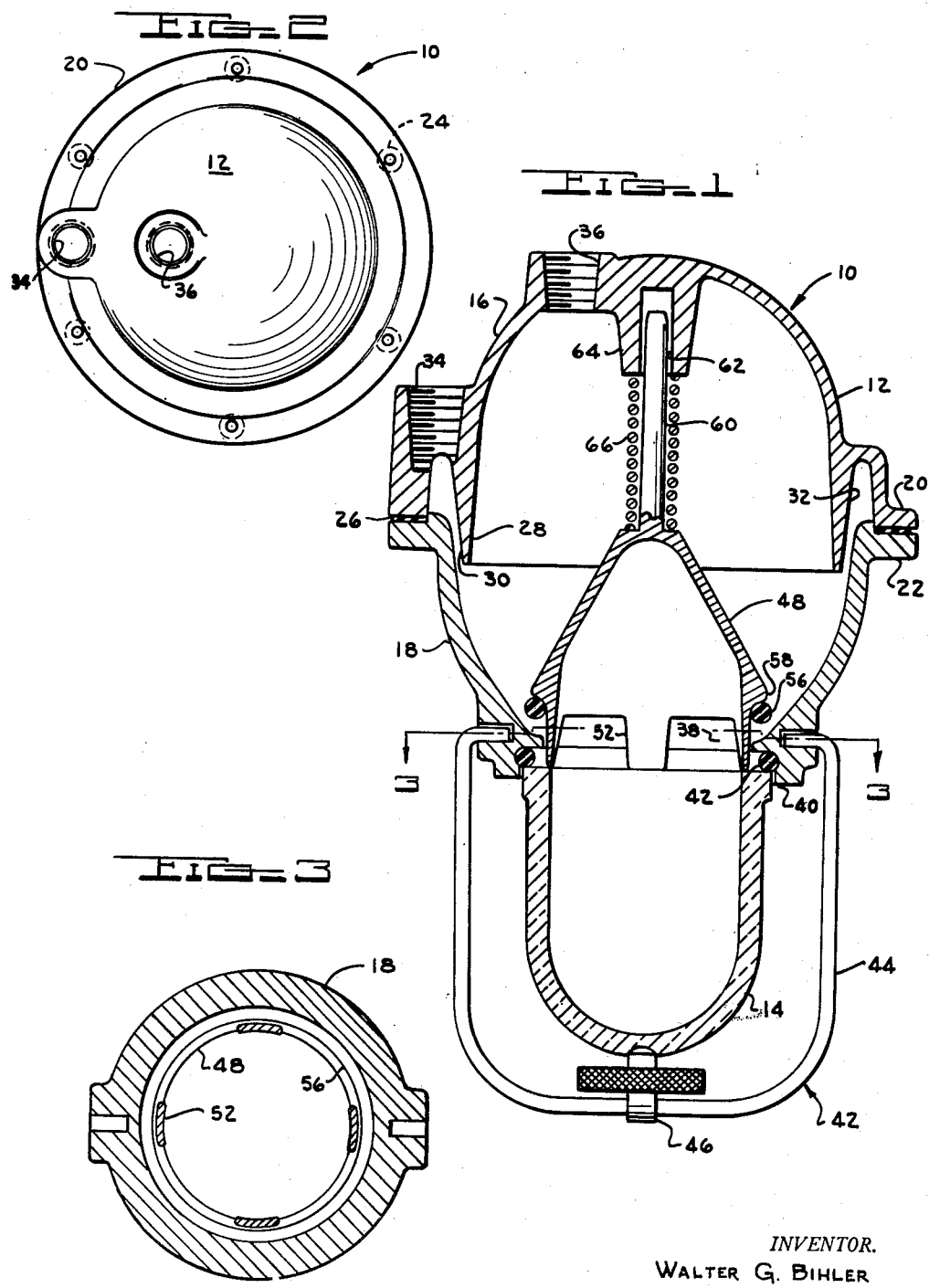

2,692,052

UNITED STATES PATENT OFFICE 2,692,052

LIQUID CLEANER UNIT

Walter G. Bihler, Franklin, Mich.

Application June 1, 1950, Serial No. 165,565

2 Claims. (Cl. 210—57)

The present invention relates to an oil cleaner or purging unit and more particularly to an oil cleaning or purging unit of the type particularly adapted for use with internal combustion engines and in which foreign particles, water, and the like, which may be in the oil passing through the unit, are separated therefrom. In the cleaner of the present invention, both the direction and rate of flow of the oil passing therethrough are changed so that the foreign particles and the like are precipitated from the oil stream without removing any of the desirable additives in the oil, the foreign particles and the like being deposited in a sediment cup when separated from the oil stream, which cup is adapted to be easily removed from the unit for the purposes of cleaning.

As is well known, lubricating oil used in internal combustion engines or other units, requires purging for the purpose of removing from the oil any foreign particles, water and the like, which may have been picked up and suspended in the lubricating oil in its regular cycle, so that maximum use can be made of the oil and at the same time eliminate the deleterious effects of such suspended matter.

One of the types of oil cleaning units which has been commonly used heretofore comprises a filter element enclosed in a housing through which a portion of the lubricating oil from the engine or the like is caused to flow. This type of oil filter does not provide the optimum results desired from an oil filtering unit for several reasons.

First, in order to insure a return supply of lubricating oil to the said engine or the like, it is necessary that a by-pass be provided around the filter unit enabling about 80 per cent of the oil to return to the engine without being filtered. This by-pass is necessary to assure proper oil flow when the filter element becomes clogged and reduces the volume of oil flow through the filter, frequently to the extent of preventing oil from passing therethrough.

Second, the conventional filter element has the undesirable characteristic of removing from the lubricating oil the additives therein.

Third, the oil filter element must be periodically changed.

One form of oil cleaner unit which has been heretofore used in an effort to avoid the above enumerated defects is that in which a sediment chamber is provided in place of the filter element, and in which it is intended that the foreign matter in the oil be trapped as the lubricating oil flows therethrough. This form of cleaner unit has not heretofore proven entirely satisfactory in use. One of the undesirable characteristics of this type of lubricating oil filter unit has been the inability of the unit to trap and retain all of the foreign matter flowing with the lubricating oil through the cleaner unit, because of turbulence and other factors causing mixing within said unit of the oil and foreign matter. This results in some of the foreign matter being carried by the lubricating oil out of the cleaner unit and back through the lubricating oil system. In some instances screens have been used in this form of cleaner unit to remove some of the foreign matter, but these units have had the first and third defects set forth above.

Another problem encountered in the oil cleaner units heretofore known was that of preventing by adequate means discharge of lubricating oil from the cleaner unit when the sediment cup was removed therefrom for the purpose of cleaning.

Accordingly, it is an object of the present invention to provide an oil cleaner unit in which the contaminated lubricating oil will be passed therethrough in a manner to cause a minimum of turbulence and by a quick change in direction and rate of flow to cause foreign matter to be deposited out of the current oil so that it can be collected by natural setting or gravity in a sediment cup adapted to permit settling of foreign matter.

It is a further object of the present invention to provide a means for closing the outlet providing communication between the interior of the housing of the cleaner unit and the sediment cup when the latter is removed from the former for the purpose of cleaning, and which is automatic in operation to prevent oil from being discharged through said opening, and further which will not interfere with settling of foreign matter in the sediment cup.

Other objects of this invention will appear in the following description and appended claims, reference being had to the accompanying drawings forming a part of this specification wherein like reference characters designate corresponding parts in the several views.

In the drawings:

Figure 1 is a vertical sectional view of one form of the oil purging unit of the present invention.

Figure 2 is a plan view of the oil purging unit shown in Figure 1.

Figure 3 is a sectional view taken on the line 3—3 of Figure 1.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the embodiment of the invention shown in the drawings, the oil cleaner unit 10 comprises an ovate housing 12 and a sediment cup 14 suitably attached thereto. The ovate housing 12 is formed from an upper housing member 16 and a lower housing member 18 which are secured together at their outwardly projecting flanges 20 and 22, respectively, by a plurality of screws 24. Any form of suitable gasket material 26 is held between the flanges 22 and 24 to prevent leakage of oil therebetween. The upper housing member 16 has a depending lip portion 28 which extends downwardly within the lower housing member 18 and is spaced therefrom to form a relatively thin annular passage 30 therebetween. The flanges 20 and 22 are spaced apart about their inner peripheries so that the flange 20 in conjunction with the lip portion 28 and the flange 22 forms an annular chamber 32. An oil inlet opening 34 is provided in the wall of the annular chamber 32 for receiving contaminated oil from the oil system in which the present oil cleaner unit is being used. At the upper end of the upper housing member 16 is an opening 36 through which the lubricating oil, after having been cleaned, will be discharged back to the lubricating oil system.

The lower housing member 18 has a relatively large opening 38 at the bottom thereof adapted to be closed by the sediment cup 14. An inwardly opening channel flange 40 is provided for retaining a gasket 42 therein to prevent leakage of oil between the lower housing member 18 and the sediment cup 14 when the oil cleaner unit 10 is in use. The sediment cup 14 is retained against the lower housing member 18 by means of a suitable clamping means 42 including the spring wire 44 and the screw clamping means 46.

From the above described construction, it can be seen that an oil cleaning unit has been provided in which contaminated oil from an oil system will enter the cleaner unit through the opening 34 to fill the annular chamber 32. From the annular chamber 32, the oil will be directed downwardly in a thin annular stream about the inner periphery of the lower housing member 18. Such foreign matter as metal particles, water, or the like, which may be in the oil, will be directed downwardly with the oil and being heavier, will be swept along the inner wall of the lower housing member 18 to the opening 38 therein and will drop into the sediment cup 12 to be trapped therein. With the oil being directed from the annular chamber 32 in the manner above-described, very little turbulence of the oil within the ovate housing 12 will be caused, and the separation of the lubricating oil from the heavier foreign matter therein, can thus be carried out in the most efficient manner by the forces of gravity.

In order to permit removal of the sediment cup 14 for the purpose of cleaning, a sealing means is provided within the ovate housing 12 for closing the opening 38 when the sediment cup 14 has been removed. This sealing means includes a conical member 48 from which depends a plurality of legs 52. The legs 52 are adapted to stand on the top of the sediment cup 14 when the latter is clamped to the ovate housing 12. The legs 52 are of sufficient length so that when they are standing on the sediment cup 14 the conical member 48 will be spaced from the ovate housing 12 above the opening 38.

The lower portion of the conical member 48 is suitably constructed to retain a gasket member 56 thereabout. An annular shoulder 58 is provided against which the gasket member 56 is seated.

Extending upwardly from the apex of the conical member 48 is a pilot rod 60 which projects into an opening 62 in the boss 64 formed in the ovate housing 12. A coil spring 66 has its ends seated on the lower end of the boss 64 and the top of the conical member 48 for biasing the latter toward the opening 38.

It can be seen from the above description that when the sediment cup 14 is removed from the housing 12, the coil spring 66 will bias the conical member 48 toward the opening 38 for closing the latter. The gasket member 56 will seal the opening 38 to prevent the discharge therethrough of lubricating oil when the cup 14 is removed.

After the sediment cup 14 has been cleaned, it is replaced in its normal operating position. This will cause the conical member 48 to be raised from the opening 38 since in placing the cup 14 in its operating position, the upper edge thereof will be pressed against the legs 52 which will force the conical member 48 upwardly against the pressure of the coil spring 66. Thus it can be seen that a sealing means is provided which will provide quick cut-off of the flow of oil from the ovate housing 12 when the sediment cup 14 is removed therefrom and which will permit communication between the interior of the sediment cup 14 and the interior of the housing 12 when the sediment cup 14 is restored to its normal operating position.

The conical member 48 has an additional function during the normal operation of the oil cleaner unit 10. As explained above, it is highly desirable to prevent turbulent flow of the oil passing through the oil cleaner unit since such turbulent flow will cause water and other foreign matter to be mixed with the oil and carried back to the lubricating system. The conical member 48 acts as a shield which will prevent turbulent action or stirring up of the foreign matter trapped in the sediment cup 14 by any unforeseen turbulence created within the ovate housing 12.

Further, by placing the entire sealing means, including the pilot rod 60 and coil spring 66, within the ovate housing 12 rather than having them extend downwardly into the sediment cup 14 as has been done in some of the earlier forms of this type of oil filter unit, an additional safeguard is provided for preventing stirring up of the sediment when trapped in the sediment cup 14. It is believed to be readily apparent that unnecessary stirring due to vibration and the like of parts of the sealing means within the sediment cup 14 may cause some of the lighter particles of foreign matter and water to be carried back into the housing 12 and to be discharged therefrom back into the lubricating oil system.

In the operation of the present oil purging unit, the oil is discharged downwardly from the chamber 32 into the interior of the ovate housing 12 as a thin annular stream. The path of flow of the oil will be downward along the inner surface of the lower housing member 18 to a point adjacent the opening 38 where the path of flow will be reversed upwardly along the surface of conical member 48. This sharp change in direction of flow of the oil together with the reduced rate of flow thereof will cause the foreign matter, such as water, metal particles and the like which are heavier than oil, to be separated therefrom and pass into the sediment cup 14 where they will be trapped.

Whenever the flow of the lubricating oil through the present purging unit is stopped, the unit will clean itself. Any foreign matter within the housing will settle toward the bottom of the unit and will be directed by the sloping surfaces of the lower housing member 18 and the conical member 48 to the sediment cup 14.

Thus the foreign matter will always settle where it can be seen and it can be removed when necessary.

Having thus described my invention, I claim:

1. A liquid cleaner unit comprising a housing open at its bottom and having an opening at its top for discharging liquid therefrom, a chamber formed in the lateral wall of said housing and having an inlet therein for receiving contaminated liquid, means forming a narrow slot extending around the inner wall of said housing for directing liquid from said chamber downwardly along said inner wall toward the open bottom, a member mounted within said housing adjacent said open bottom to form with said inner wall an endless discharge passage, said member having walls converging toward the top of said housing so that the liquid directed downwardly along said inner wall will have its direction of flow substantially reversed over said discharge passage and thereafter the liquid will flow upwardly toward the opening at the top of said housing, and means at the bottom of said housing for closing said discharge passage.

2. A liquid cleaner unit as claimed in claim 1 wherein the last named means includes a sediment cup removably secured to said housing for closing the open bottom, and a mechanism within said housing for closing said open bottom when said sediment cup is removed.

References Cited in the file of this patent

UNITED STATES PATENTS

| Number | Name | Date |
|---|---|---|
| 1,173,725 | Ludwig et al. | Feb. 29, 1916 |
| 1,477,947 | Ensign | Dec. 18, 1923 |
| 1,574,336 | Blydenburgh | Feb. 23, 1926 |
| 1,720,380 | Schulze | July 9, 1929 |
| 1,781,874 | Hopkins | Nov. 18, 1930 |
| 1,820,790 | Feezer | Aug. 25, 1931 |
| 1,854,738 | Hays | Apr. 19, 1932 |
| 1,933,409 | Berman | Oct. 31, 1933 |
| 2,446,587 | Henry | Aug. 10, 1948 |
| 2,465,021 | Kennison et al. | Mar. 22, 1949 |

FOREIGN PATENTS

| Number | Country | Date |
|---|---|---|
| 157,669 | Great Britain | Jan. 27, 1921 |
| 164,538 | Great Britain | June 16, 1921 |
| 47,711 | Norway | Mar. 24, 1930 |